March 4, 1958  D. J. LE VINE ET AL  2,825,876
RADIO FREQUENCY TRANSDUCERS

Filed Jan. 14, 1954  4 Sheets-Sheet 1

INVENTORS
DONALD J. LE VINE
ROBERT J. MERKEL
BY
ATTORNEY

INVENTORS
DONALD J. LE VINE
ROBERT J. MERKEL
BY
ATTORNEY

March 4, 1958 D. J. LE VINE ET AL 2,825,876
RADIO FREQUENCY TRANSDUCERS
Filed Jan. 14, 1954 4 Sheets-Sheet 3

INVENTORS
DONALD J. LE VINE
ROBERT J. MERKEL
BY
ATTORNEY

INVENTORS
DONALD J. LE VINE
ROBERT J. MERKEL
BY
ATTORNEY

United States Patent Office 2,825,876
Patented Mar. 4, 1958

2,825,876

RADIO FREQUENCY TRANSDUCERS

Donald J. Le Vine, New York, N. Y., and Robert J. Merkel, Clifton, N. J., assignors to International Telephone and Telegraph Corporation, Nutley, N. J., a corporation of Maryland Application January 14, 1954, Serial No. 404,020

7 Claims. (Cl. 333—34)

This invention relates to radio frequency transducers and more particularly to a transducer for coupling together two different types of radio frequency waveguides, one being of the hollow rectangular type while the other is of the two-conductor Microstrip type.

In high and ultra high radio frequency systems it is often desirable to use different types of waveguides in different parts of the system, thus requiring transducer couplings between such waveguides. The present invention provides a radio frequency transducer for coupling together a hollow waveguide and a Microstrip transmission line, the latter comprising a pair of conductors, one wider than the other, dielectrically spaced part in parallel relation. The Microstrip form of waveguide is preferred in radio frequency circuitry over the hollow waveguide in that Microstrip is negligible in cost compared to the high cost of waveguide "plumbing." Furthermore Microstrip circuitry is easily printed, is light in weight and easily coupled to electrical components, and has wide band and low loss characteristics. The hollow type of waveguide, on the other hand, is sometimes preferred for use with certain standard test and monitoring gear and for relatively long leads between separated parts of the system.

One of the objects of this invention is to provide broad band, low radiation loss transducers for coupling together two different types of waveguides, such for example as the hollow and Microstrip types.

Another object of the invention is to provide a transducer capable of coupling relatively high power between two such types of waveguides.

One of the main features of the invention is the provision of a ridge conductor in the end portion of the hollow waveguide to which a Microstrip line is to be coupled. The ridge conductor is decreased in at least one cross-wise dimension thereof from a maximum size at the end to which the Microstrip line is coupled to a minimum size a distance disposed inwardly of the hollow waveguide. This decrease in size of the ridge conductor may take several forms, one being a taper, a curved edge, an impedance transformer stepped arrangement or even a flared configuration.

The above-mentioned and other features and objects of this invention and the manner of attaining them will become more apparent by reference to the following description taken in conjunction with the accompanying drawings, wherein.

Figure 11:
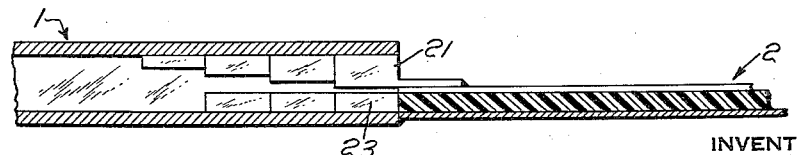
Figure 12:
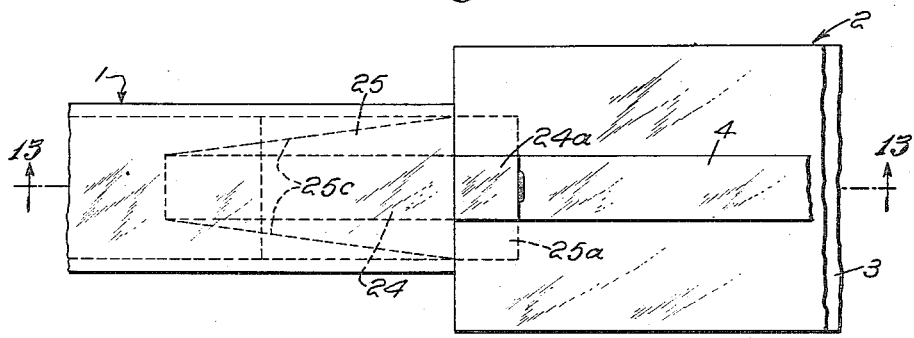
Figure 13:
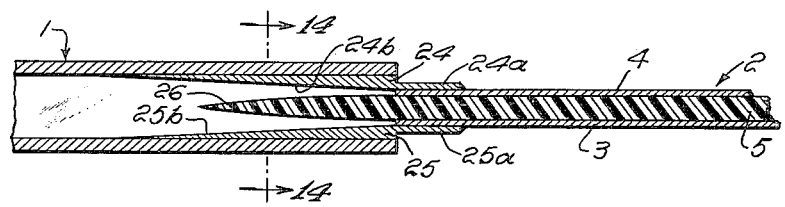
Figure 14:
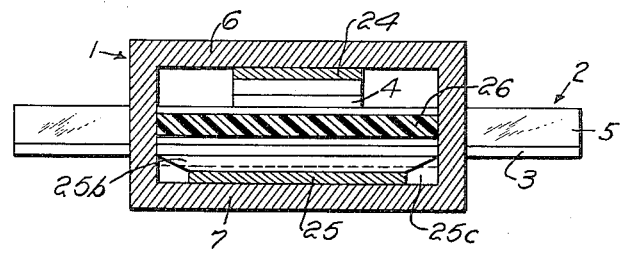

Figs. 5, 7, 9, 11 and 13, are longitudinal sectional views taken along lines 5—5, 7—7, 9—9, 11—11 and 13—13 of Figs. 4, 6, 8, 10, and 12, respectively; and Fig. 14 is a cross-sectional view taken along line 14—14 of Fig. 13.

Figure 1:
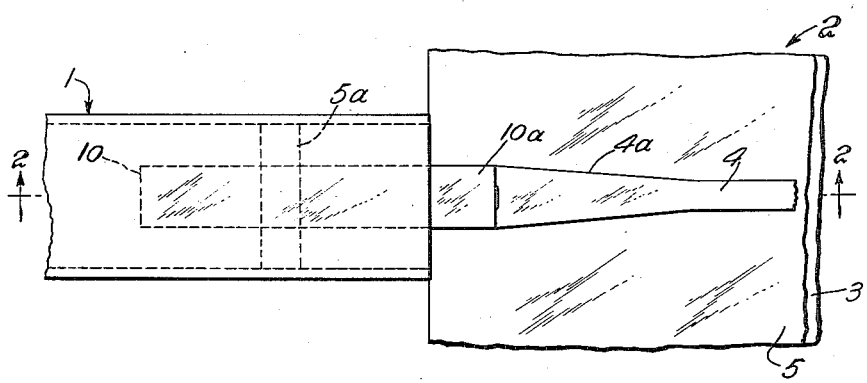
Fig. 1 is a view in plan of a transducer coupling according to the principles of the invention.
Figure 2:
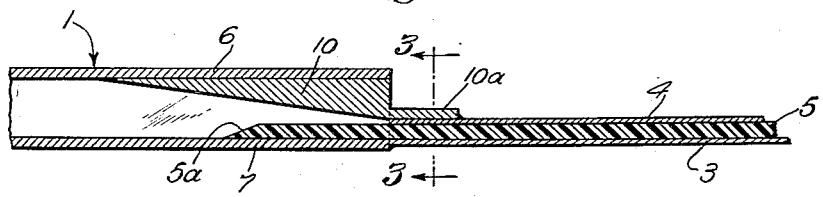
Fig. 2 is a longitudinal cross-sectional view taken along line 2—2 of Fig. 1.
Figure 3:
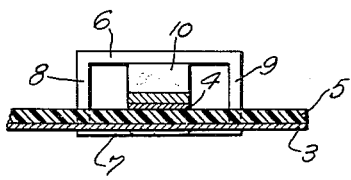
Fig. 3 is a cross-sectional view taken along line 3—3 of Fig. 2.

The basic problem in providing a transducer between a waveguide structure, such as a rectangular waveguide supporting the $TE_{10}$ mode and a transmission structure such as Microstrip supporting a mode that is presumed to be essentially TEM, is to obtain propagation transition therethrough with a minimum of radiation and reflection losses at the transition. In Figs. 1, 2, and 3, we have shown a transducer arrangement which has proved to have exceptionally low loss. The hollow waveguide 1 is shown to be of the rectangular form while the Microstrip waveguide 2 is shown to comprise two flat strip conductors 3 and 4 separated by a layer of dielectric material 5. The first strip conductor 3 is made considerably wider than the second strip conductor 4 in order to present thereto a planar conducting surface. The dielectric layer which may be of polyethylene, polystyrene, "Teflon," fiberglass or laminations of fiberglass and "Teflon" or other suitable material of high dielectric quality, is utilized as a supporting medium for the conductors 3 and 4 which may be applied thereto in the desired configuration by known printing technique. Instead of employing solid dielectric, air may be used as the dielectric where self supporting conductors are used, as in an adjustable attenuator, for example.

As shown more clearly in Fig. 3, the rectangular waveguide 1 comprises upper and lower walls 6 and 7 and side walls 8 and 9. The Microstrip line is coupled end-to-end to the rectangular waveguide, the planar conductor 3 being connected directly to the lower wall 7 with the upper surface of conductor 3 preferably flush with the upper or inner surface of wall 7. The spacing of the conductors 3 and 4 is small compared to the spacing between the upper and lower walls 6 and 7 so that when the conductor is in the plane of the lower wall 7 the conductor 4 is in line with the interior of the waveguide 1. The characteristic impedance of the Microstrip line is determined by the width of the conductor 4 and its spacing from the planar conductor 3 and also the dielectric constant of the material 5 disposed therebetween. It is normally preferred to employ a ridge conductor having the same width as the strip conductor 4 although this is not essential. In Fig. 1 we show a ridge conductor 10 which is wider than the conductor 4 and provide the end of the conductor 4 with a tapered section 4a so that the end thereof is of the same width as the ridge conductor 10. The ridge conductor is in this form tapered from a maximum depth dimension at the end connected to the Microstrip line, the tapered portion extending inwardly of the hollow waveguide 1 in conductive contact with the upper wall 6. The ridge conductor is maintained uniform in width throughout its length. The forward end of the ridge conductor 10 is provided with a tongue extension 10a protruding from the end of the hollow waveguide 1 in overlying engagement with the strip conductor 4. The purpose of the tongue 10a is to facilitate soldering, the tongue being relatively thin so as to require a relatively small amount of heat to effect a soldered joint between the tongue and the strip 4. The dielectric 5 may be terminated at the entrance to the waveguide 1 for relatively low power propagation. For high power propagation it was found desirable to extend the dielectric a distance into the waveguide 1 to avoid electrical breakdown. The inner end of the dielectric layer 5 is preferably tapered as indicated at 5a to enhance smooth transition through the transducer.

By way of example, the particular embodiment shown in Figs. 1, 2 and 3, was built and tested employing a rectangular waveguide 1" x ½" and a wall thickness of .05". The widths of the Microstrip tested were between ½" and ¾", the dielectric being ⅛" thick and made of fiberglass laminate. The conductors 3 and 4 were of copper foil 0.005" thick. The ridge conductor 10 which was of a length of about 2" was tapered substantially as shown in Fig. 2. The length was not found to be very critical. Several ridge widths were tried between ⅜" and ½". The frequencies employed were between 8,400 and 10,400 megacycles per second. Throughout this range the overall minimum loss obtained in a unit having two transducers was in the order of 0.5 to 1 db. The probable loss due to each transducer per se neglecting the loss present in the Microstrip between the transducers was found to be approximately 0.25 db. This loss includes both ridge and radiation loss, the exact ratio being unknown. It is believed that the ridge loss could be reduced by employing copper or silver plated ridge structures and by soldering the ridge conductor 10 to the wall 6, the test having been made with these two parts under pressure contact. It is believed that the transition of this transducer construction is relatively smooth in that the field concentrations of the Microstrip is in the immediate vicinity of strip 4, particularly between the strip 4 and the adjacent surface of the planar conductor 3, while the field is similarly concentrated between the ridge 10 and the opposed wall 7. Since the ridged transition occurs within the rectangular waveguide there is no loss due to radiation from that region. The tapered ridged transducer was found to have fairly good VSWR (voltage standing wave ratio) and loss characteristics over a wide band of frequencies, the average VSWR being about 1.4 for the frequency range of 8.4 to 10.4 kilocycles. Tests of this embodiment with the dielectric extending into the waveguide 1 showed that it had high resistance to "breakdown" and was successful in propagation of power as high as 20 kilowatts.

Figure 4:
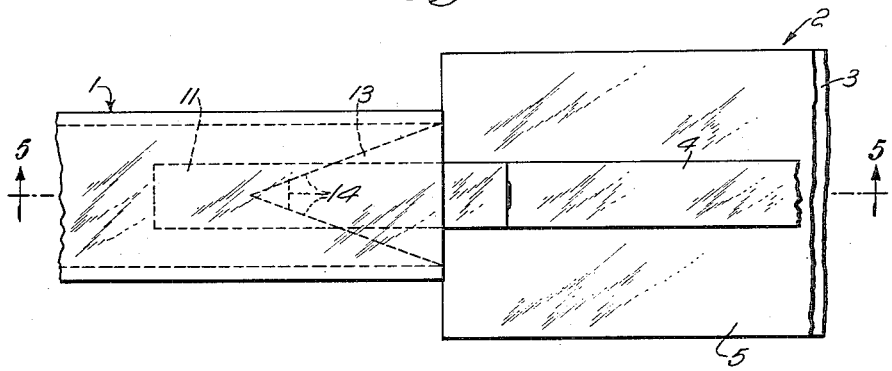
Figs. 4, 6, 8, 10 and 12, are plan views of modified forms of transducer arrangements.
Figure 5:
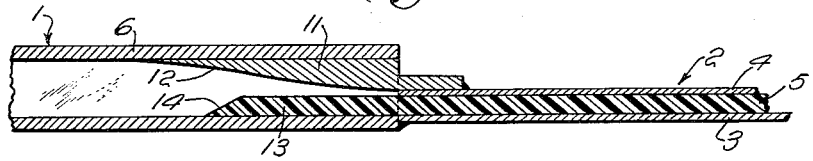

Referring to Figs. 4 and 5, a modified form of transducer is shown wherein the ridge conductor 11 is shown to have a ridge surface 12 which is curved asymptotically between the plane of the strip conductor 4 and the plane of the inner surface of the wall 6. In this embodiment we have also shown the dielectric layer 5 to be extended into the hollow waveguide as indicated at 13 for at least part of the length of the ridge conductor 11. This extension of the dielectric into the waveguide as hereinbefore explained is desirable to reduce possibility of voltage breakdown in the transition region of the transducer. This extension of the dielectric is tapered as indicated at 14 to show another way of enhancing smooth transition and minimize impedance mismatch.

Figure 6:
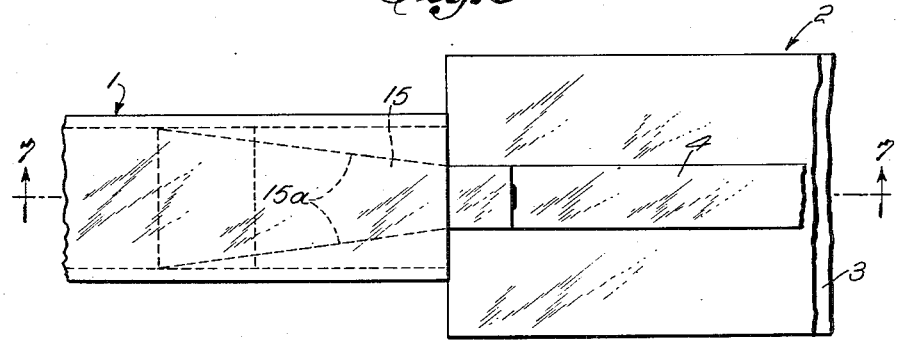
Figure 7:
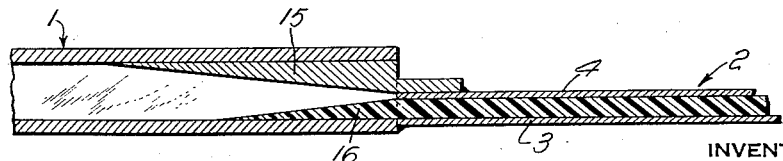

In Figs. 6 and 7, a further variation in the transducer is shown wherein the ridge conductor 15 is flared outwardly as indicated at 15a from the width of the strip conductor 4 to the width of the hollow waveguide 1. The dielectric layer 16 which extends into the hollow waveguide 1 is tapered in thickness. From the foregoing it will be clear that the ridge conductor as well as the dielectric extension may take various forms with the view to smoothing out the transition from the mode of propagation in the hollow waveguide and the mode of propagation along the Microstrip conductors.

Figure 8:
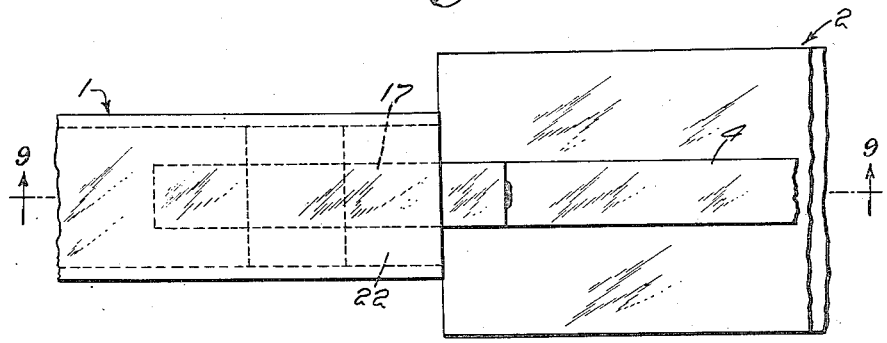
Figure 9:
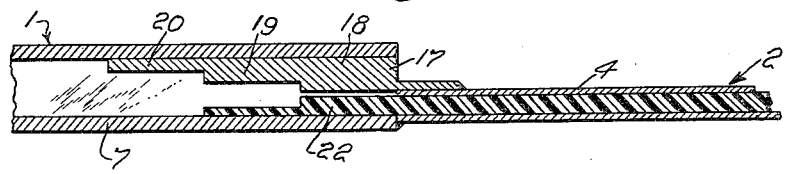
Figure 10:
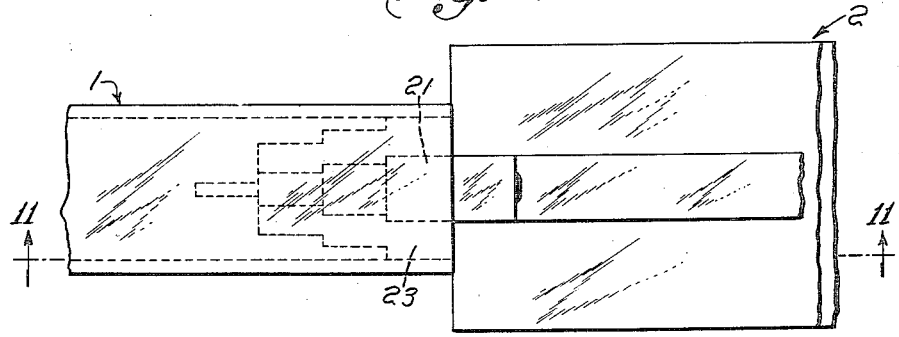

In Figs. 8 to 11 we have shown two additional embodiments wherein the ridge conductor is shaped to form discrete impedance transformer sections. As shown in Figs. 8 and 9, the ridge conductor 17 is shown to have three different thicknesses in sections 18, 19 and 20. The ridge conductor is shown to be in the form having a width corresponding to the width of the strip conductor 4 so that the first section 18 has a characteristic impedance relationship with respect to the bottom wall 7 of the waveguide 1 corresponding substantially to that of the Microstrip line 2. The length of the sections are preferably one-quarter guide wavelength. The greater the number of impedance transformer sections provided throughout the length of the ridge conductor the broader in band width will be the transducer. While we have shown the ridge conductor to be stepped in the ridge depth only in the embodiment of Figs. 8 and 9, it will be understood that the transformation may also be performed by stepping the ridge conductor in its width and if desired in both width and depth as shown in Figs. 10 and 11. In this latter embodiment the ridge conductor 21 is shown to have four sections each progressively smaller in both the width and depth dimensions. The extension of the dielectric layer shown at 22, Figs. 8 and 9, extends the full width of the hollow waveguide and for about two-thirds of the length of the conductors 17, and stepped in thickness in line with the steps in conductor 17. The layer 23, Figs. 10 and 11 is stepped in width in line with the steps in conductor 23, and if desired, could also be stepped in thickness similar to layer 22. This choice of length of the dielectric extensions is not critical.

Referring to Figs. 12, 13 and 14, we have shown a transducer which is provided with two opposed ridge-like conductors 24 and 25. In this form, the planar conductor 3 is connected part way up the side walls of the waveguide 1 whereby the location of conductors 3 and 4 is symmetrical with respect to the upper and lower walls 6 and 7 of the waveguide. The ridge conductor 24 is similar to the form shown at 10 in Figs. 1, 2, 3 in that it is tapered in the depth dimension at 24b and provided with a tongue 24a which is conductively connected to the strip conductor 4. The lower ridge or ramp conductor 25, however, is the full width of the waveguide 1 at least at the end thereof and is provided with a tongue 25a to underlie the planar conductor 3 to which it is secured. The ramp conductor 25 is tapered in thickness as indicated at 25b and also in width as indicated at 25c, Fig. 12. If desired the conductor 25 may be the same width as the interior of the waveguide 1 for the entire length of the conductor. While we prefer to taper the conductors 24 and 25 it is to be clearly understood that these conductors may be otherwise shaped similar to the forms shown in Figs. 4 to 11. In this embodiment the extension 26 of the dielectric layer 5 is tapered in thickness symmetrically with respect to the opposed surfaces of conductors 24 and 25. If desired, the dielectric may be flared in thickness to fill completely the space between conductors 24 and 25 with the end thereof tapered beyond the ends of conductors 24 and 25. As a further alternative, the extension 26 may also be tapered in width or stepped similarly as indicated in the embodiments of Figs. 4 and 8 to 11.

While we have illustrated our invention with a rectangular form of waveguide, it will be readily recognized by those skilled in the art that other forms of hollow waveguides including circular and elliptical waveguides as well as horn antennas of different shapes may be coupled by our ridge type of transducer to Microstrip lines. It will also be recognized that the dielectric layer may or may not be tapered or extended into the hollow waveguide depending upon ease of fabrication and tuning devices that may be provided in the waveguides adjacent the transducer. It should also be understood that the ridge conductor while shown in certain shapes may be varied considerably therefrom as regards the relative length, degree of taper or curvature or the number of impedance transforming steps.

While we have described above the principles of our invention in connection with specific apparatus, it is to be clearly understood that this description is made only by way of example and not as a limitation to the scope of our invention, as set forth in the objects thereof and in the accompanying claims.

We claim:

1. In combination, a hollow waveguide having a given cross-wise configuration, a second waveguide comprising first and second conductors, and a layer of dielectric material interposed between said conductors to maintain them in parallel spaced relation, said first conductor being wider than said second conductor to present thereto a planar surface, and at least as wide as said hollow waveguide, the spacing between said first and second conductors being considerably less than a cross-wise dimension of said hollow waveguide and conductively open along the side edges of said second conductor, said second waveguide being disposed in longitudinal end-to-end relation to said hollow waveguide with said second conductor in longitudinal alignment with the interior of said hollow waveguide, means conductively coupling said first conductor to a wall of said hollow waveguide and a tapered ridge conductor disposed on the inner surface of said hollow waveguide longitudinally thereof as a conductive extension of said second conductor, said layer of dielectric material being extended into said hollow waveguide and having at least the inner end portion thereof tapered.

2. In combination, a hollow waveguide having a given cross-wise configuration, a second waveguide comprising first and second conductors, and a layer of dielectric material interposed between said conductors to maintain them in parallel spaced relation, said first conductor being wider than said second conductor to present thereto a planar surface, and at least as wide as said hollow waveguide, the spacing between said first and second conductors being considerably less than a cross-wise dimension of said hollow waveguide and conductively open along the side edges of said second conductor, said second waveguide being disposed in longitudinal end-to-end relation to said hollow waveguide with said second conductor in longitudinal alignment with the interior of said hollow waveguide, means conductively coupling said first conductor to a wall of said hollow waveguide and a ridge conductor disposed on the inner surface of said hollow waveguide longitudinally thereof as a conductive extension of said second conductor, said ridge conductor being tapered off in the form of steps from a maximum cross-sectional area at the coupled end thereof to a minimum cross-sectional area at the other end thereof.

3. The combination according to claim 2, wherein said layer of dielectric material extends into said hollow waveguide and is stepped in cross-sectional area in line with steps in said ridge conductor.

4. In combination, a hollow rectangular waveguide having two opposed walls, a second waveguide comprising first and second conductors, and a layer of dielectric material interposed between said conductors to maintain them in parallel spaced relation, said first conductor being wider than said second conductor to present thereto a planar surface, and at least as wide as said hollow waveguide, the spacing between said first and second conductors being considerably less than the space between said opposed walls and conductively open along the side edges of said second conductor, said second waveguide being disposed in longitudinal end-to-end relation to said hollow waveguide with said first and second conductors parallel to said opposed walls and in longitudinal alignment with the interior therebetween, a ramp-like conductor carried by one of said walls with the end of said ramp conductor conductively coupled to said first conductor and a ridge conductor carried by the other of said walls longitudinally thereof as a conductive extension of said second conductor.

5. In combination, a hollow rectangular waveguide having a given minimum cross-wise dimension between two opposed walls thereof, a second waveguide comprising first and second conductors of flat strip form, said first conductor being wider than said second conductor so as to present a planar surface thereto, a layer of dielectric material disposed between said conductors to maintain them in parallel spaced relation, the spacing being less than said given minimum dimension and conductively open along the side edges of said second conductor, first and second ridge conductors disposed longitudinally in said hollow waveguide in coupled relation to said first and second, opposed walls, respectively, said waveguides being disposed in longitudinal end-to-end relation means conductively coupling said first ridge conductor to said first strip conductor and means conductively coupling said second ridge conductor to said second strip conductor, said ridge conductors being decreased from a maximum ridge depth at the coupled ends thereof to a minimum ridge depth at the other ends thereof.

6. The combination according to claim 5 wherein said first ridge conductor is at least as wide as the interior of said hollow waveguide at the end thereof coupled to said first strip conductor.

7. The combination according to claim 5, wherein said layer of dielectric extends into said hollow waveguide for at least part of the length of said ridge conductors.

References Cited in the file of this patent

UNITED STATES PATENTS

| | | |
|---|---|---|
| 2,531,437 | Johnson et al. | Nov. 28, 1950 |
| 2,584,162 | Sensiper et al. | Feb. 5, 1952 |
| 2,633,493 | Cohn | Mar. 31, 1953 |

FOREIGN PATENTS

| | | |
|---|---|---|
| 891,442 | France | Dec. 11, 1943 |

OTHER REFERENCES

"Proceedings of the I. R. E."; vol. 40, pp. 1644–1650; December 1952.